Feb. 23, 1965 L. A. SINCLAIR 3,170,325
BATTERY VENT CAP FLUID LEVEL INDICATOR
Filed April 27, 1962

INVENTOR
LEWIS A. SINCLAIR

BY John J. Byrne
ATTORNEY

United States Patent Office 3,170,325
Patented Feb. 23, 1965

3,170,325
BATTERY VENT CAP FLUID LEVEL INDICATOR
Lewis A. Sinclair, 905 Terrace Drive, Annandale, Va.
Filed Apr. 27, 1962, Ser. No. 190,589
2 Claims. (Cl. 73—306)

This invention relates to new and useful improvements in vent caps for storage batteries, and specifically relates to a fluid level indicator carried within a transparent vent cap housing.

An important objective of the invention is to provide a vent cap fluid indicator device which is adaptable to batteries of varying dimensions.

A still further objective of the invention is to provide an improved battery vent cap which includes an indicator observable from the exterior thereof, and is well protected from foreign objects.

Another important objective of this invention is to provide a vent cap which indicates the level of the fluid within the cap and includes means by which water may be added to the battery without disturbing or removing the vent cap itself.

A further objective of the invention is to enclose a bobbing type float indicator completely within a housing where its operation will be unaffected by dirt or accidental breakage by a mechanic.

A still further objective of the invention is to provide a vent cap of the type described which has an inherent ease of manufacture, is inexpensive, and is of rugged construction.

A further objective of this invention is to provide a float mechanism within a vent cap indicator combination which may be adapted for batteries having varying construction dimensions.

Another important objective of the invention is to provide a vent cap fluid level indicating device which provides means whereby the critical dimensions between the desirable fluid level and the top of the battery may be adjusted according to the construction specifics of the battery.

These and other objectives and advantages of the invention will be more fully understood upon a reading of the following specifications taken in view of the attached drawings wherein.

Figure 1:
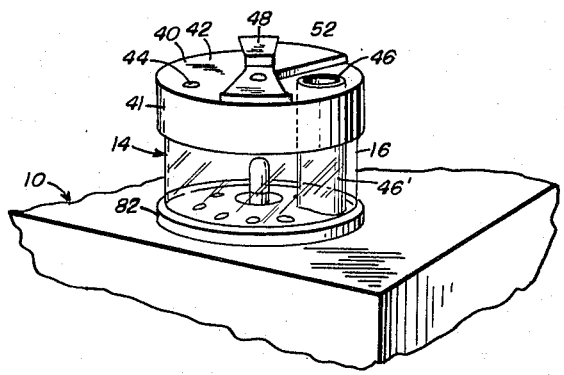
FIGURE 1 is a perspective view of a wet cell storage battery having a transparent indicating device mounted to one of the cell openings.

Referring now more specifically to the drawings wherein like numerals indicate like parts, the numeral 10 designates a conventional multiple wet-celled battery having a plurality of cap openings 12 therein. Mounted within each of such cap openings is a transparent vent cap assembly designated by the numeral 14.

The cap body is comprised generally of a cylindrical transparent housing 16 which is threaded at 18 about a portion of its exterior length. The threaded portion 18 is adapted to be received in mating threads 20 which define the battery vent cap opening 12. Extending downwardly from the transparent housing is a depending skirt 22 having a plurality of perforations 24 therein. The skirt is terminated along its lower edge by an annular inwardly directed flange 26 which defines a lower opening 28. The circumference or periphery of the depending skirt 22 is slightly less than that of housing 16 and there is thus formed an annular ledge or step 30 between the housing and the skirt.

Resting on ledge 30 and preferably press-fitted within the housing is a plug member 32 having a central guide opening 34 communicating the interior of skirt section 22 to the interior of housing 16. The lower surface of plug member 32 is concave, and is so designated by the numeral 36.

Several filling grooves 38, having a smaller diameter than opening 34, additionally communicate the interior of the skirt with the interior of housing 16.

Figure 3:
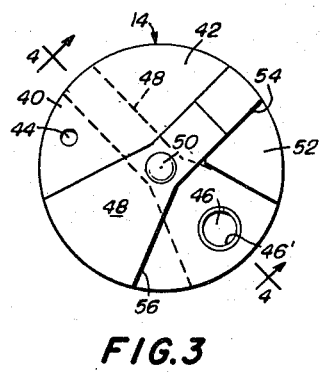
FIGURE 3 is a plan view.

Housing 16 is enclosed by a lid or cap 40 which is comprised of a downwardly extending flange 41 which is adapted to be press-fittingly secured to the upper edge of housing 16 and a circular top 42. Top 42 is formed with a breathing vent 44, and a filling aperture 46. Secured to the center of cover 42 is a bell shaped member 48 pivotally supported by way of a pin or boss 50. Also mounted on the upper surface of top 42 is a positioning lug 52. As can be best seen in FIG. 3, the member 48 has a first position shown in solid lines wherein its edge 54 is against the stop lug 52 and both apertures are open, and a second position shown in dotted lines, in which its edge 56 is against lug member 52 and the filling aperture 46 is closed, but the breathing vent 44 remains open. Depending downwardly from opening 40 is a tubular member 46' which leads to a point closely adjacent the upper surface of plug member 32.

A float 60 having an elongated stem 62 extending upwardly therefrom comprises the indicating means of this invention. The float member is substantially spherical and is comprised of a series of laminated plastic or wood members 66. The stem member and the plug member 32 are likewise manufactured from a plurality of vertical laminations 68 and 33, respectively. The laminations are secured to each other with a glue which is not as strong as the material from which the laminations are made. This permits a user to strip laminations from the bottom of the stem member 62, from the top of plug 32, such that the assembly can be made to adjust to various batteries. The stem 64 is press-fitted into a groove 74 which is formed perpendicularly to the laminations.

Figure 2:
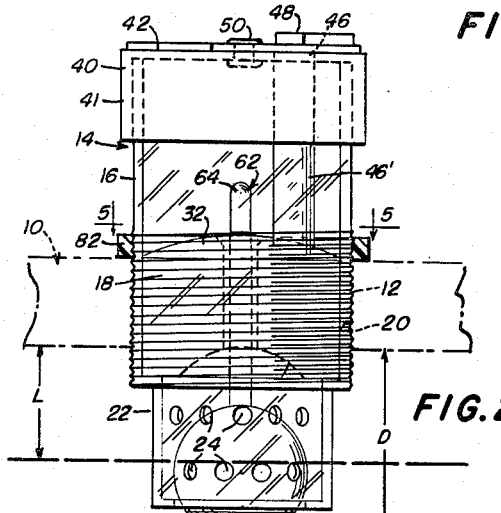
FIGURE 2 is an elevation view of the invention showing the top battery surface in phantom.

In the average wet-cell battery there is normally a critical distance between the desired water level L and the interior of the under surface of the top plate of the battery 10. A simple chart may be supplied with the assembly which shows the number of laminations which should be removed from the float 60 from the stem 62 and plug 32, prior to its insertion, for a particular battery. Note in FIGS. 2 and 4, that several laminations have been removed from the bottom of the normally spherical float 60.

In many modern batteries the distance between the top of the battery plates and the upper surface of the battery body is reduced to a minimum. Through the laminated construction of the float assembly working in combination with the adjustable height of concave surface 36 and its mating with the spherical float, there is permitted a great deal of movement in stem 62, even though the battery is made in a very compact manner.

Figure 4:
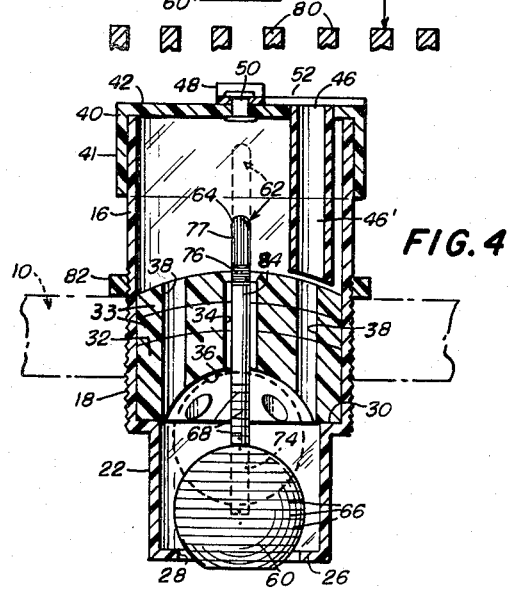
FIGURE 4 is a vertical cross-sectional view taken along the line 4—4 of FIG. 3.
Figure 5:
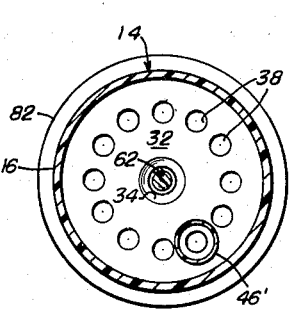
FIGURE 5 is a horizontal cross-sectional view taken along the line 5—5 of FIG. 2.

The stem 62 has a portion 84 painted green, an intermediate portion 76 painted yellow, and its upper section 77 is painted red. As seen in FIG. 4, the level of a liquid L may be determined by noting the color exposed through the transparent casing 16. For instance, if green is shown there is an adequate amount of water within the battery. If yellow is observable it is time to add water, and if red alone is visible, the battery fluid is much too low and water should be added.

Of importance is the distance D between the interior of the top of the battery and cell plates 80. This distance varies for different makes and types of battery. The stop flange 26 prevents the float 60 from escaping the assembly in the event the fluid level falls well below the bottom of skirt 22. A locking ring 82 is added so that the depth of the cap can be adjusted with respect to the plates 80.

Prior to assembly, the apparatus is in five pieces, namely; the float, the stem, the housing skirt, the plug, and the cap. In operation a user need merely determine the appropriate length of stem 62 and the appropriate diameter for float 69. The desired laminations are removed from each, and the stem 62 is press-fitted into the aperture 74. The float assembly is then placed within the skirt 22 and the plug member 32 is press-fitted into position against shoulder 30 such that the bore 34 receives the stem 62. The cap member is then press-fitted to housing 16 and the vent cap assembly is threadably secured to the battery for the life thereof. However, if it is necessary to test specific gravity, the cap can be removed.

It is oftentimes desirable to fill the battery to its desired level prior to securing the cap into the aperture 12. By doing this, a user may check his stem guage and insure himself that his indicating device is working properly.

In a general manner, while there has been disclosed in the above description, what is deemed to be the most practical and efficient embodiment of the invention, it should be well understood that the invention is not limited to such an embodiment as there might be changes made in the arrangement, disposition and form of the parts without departing from the principle of the present invention as comprehended with the scope of the accompanying claims.

I claim:
1. A vent cap fluid level indicator for a wet-cell battery having at least one cap receiving opening therein, comprising in combination, a housing of transparent material, adapted to be receivably secured in said opening, a perforated skirt extending downwardly from said housing, a lid secured to the upper portion of said housing and having a breathing aperture and a filling aperture therein, a plug having a central guide opening within said housing and having a lower concave surface, a float within said skirt section having an upper convex surface mating with said concave surface, a stem extending upwardly from said float through said guide opening into said housing, said stem and float respectively comprised of a series of horizontal laminations removably secured to each other such that their lengths may be varied, and indication means on said stem observable through said housing.

2. A vent cap fluid level indicator for a wet-cell battery having at least one threaded cap receiving opening therein, comprising in combination, a housing having a threaded mid portion adapted to be threadably secured in said opening, a transparent portion extending upwardly from said mid portion, a perforated skirt extending downwardly from said threaded portion, an inwardly directed annular flange about the lower edge of said skirt, a lid secured to the upper portion of said housing and having a breathing aperture and a filling aperture therein, means pivotally secured to said lid for covering and uncovering said filling aperture, a plug having a central guide opening within said housing and having a lower concave surface, a float within said skirt section having an upper convex surface mating with said concave surface and a diameter greater than the opening defined by said annular flange, a stem extending upwardly from said float through said guide opening into said housing, indication means on said stem observable through said housing, and said float comprised of a series of horizontal laminations removably secured to each other such that its top-to-bottom dimension can be varied.

References Cited by the Examiner
UNITED STATES PATENTS

| | | | |
|---|---|---|---|
| 290,154 | 12/83 | Vidal | 43—43.1 |
| 1,482,852 | 2/24 | Kloepper. | |
| 1,643,238 | 9/27 | Curtis. | |
| 1,703,233 | 2/29 | Hall et al. | |
| 2,484,163 | 10/49 | Gosheff | 73—306 |
| 2,562,604 | 7/51 | Couchey | 73—306 |

JOHN H. MACK, *Primary Examiner.*

JOHN R. SPECK, WINSTON A. DOUGLAS, *Examiners.*